US012682742B1

(12) United States Patent
Finkle

(10) Patent No.: US 12,682,742 B1
(45) Date of Patent: Jul. 14, 2026

(54) PROGRAMABLE ALARM ASSEMBLY FOR EMERGENCY ACTIVATION DEVICES

(71) Applicant: Louis J Finkle, Lakewood (UA)

(72) Inventor: Louis J Finkle, Lakewood (UA)

( * ) Notice: Subject to any disclaimer, the term of this patent is extended or adjusted under 35 U.S.C. 154(b) by 0 days.

(21) Appl. No.: 19/293,802

(22) Filed: Aug. 7, 2025

Related U.S. Application Data

(63) Continuation of application No. 19/185,076, filed on Apr. 21, 2025, now Pat. No. 12,406,569.

(51) Int. Cl.
*G08B 25/12* (2006.01)
*G08B 17/06* (2006.01)

(52) U.S. Cl.
CPC ............. *G08B 25/12* (2013.01); *G08B 17/06* (2013.01)

(58) Field of Classification Search
CPC ................................ G08B 25/12; G08B 17/06
See application file for complete search history.

(56) References Cited

U.S. PATENT DOCUMENTS

| | | | | |
|---|---|---|---|---|
| 5,955,939 | A * | 9/1999 | Taylor | G08B 25/12 200/333 |
| 10,706,703 | B1 * | 7/2020 | Barr | G08B 13/08 |
| 2009/0027220 | A1 * | 1/2009 | Pichard | G08B 13/08 340/665 |
| 2014/0003586 | A1 * | 1/2014 | Agrawal | G08B 21/02 379/37 |
| 2020/0066125 | A1 * | 2/2020 | Boguslawski | G08B 17/10 |
| 2023/0036315 | A1 * | 2/2023 | Savage, Jr. | G08B 25/00 |

* cited by examiner

*Primary Examiner* — Davetta W Goins
*Assistant Examiner* — Sharmin Akhter
(74) *Attorney, Agent, or Firm* — AGK Patent & Trademark Law; Philip Y Kim

(57) ABSTRACT

A programmable safety cover system for protecting an emergency activation device is provided. The system comprises a housing having a cover and a base, and an alarm assembly featuring a programmable controller. A user-actuatable element allows for the initiation of a software-defined grace period, suppressing the alarm during installation or maintenance. The controller is field-programmable, allowing for customization of alarm parameters such as duration, sound and light patterns, and custom audible warnings. The controller can also be configured to continue alarming for a set period after the cover is closed to deter false activations, and to play context-specific spoken warnings to enhance user safety and accessibility.

12 Claims, 18 Drawing Sheets

PROGRAMABLE ALARM ASSEMBLY FOR EMERGENCY ACTIVATION DEVICES

CROSS-REFERENCE TO RELATED APPLICATIONS

The present application is a Continuation In Part of U.S. patent application Ser. No. 19/185,076 filed Apr. 21, 2025, which application is incorporated in its entirety herein by reference.

BACKGROUND OF THE INVENTION

The present invention relates to housings for emergency activation devices. Such devices are typically mounted to a wall and, when activated, trigger an alarm. They are commonly used for fire alarms, emergency stops, and suppression system releases. Due to the critical nature and electrical components involved, these activation devices are often secured by a protective housing to prevent accidental or malicious activation.

Most conventional housings for these devices are mechanically simple. They may have a cover that is broken or lifted to access the activation device. While some covers include a simple, non-configurable alarm that sounds when the cover is lifted, these systems suffer from significant drawbacks.

A primary challenge arises during installation and maintenance. When a power source is connected to a conventional armed cover, its local alarm (e.g., a sounder or strobe) triggers immediately. This creates a disruptive environment for the installer. Existing methods to temporarily disable the alarm, such as using a small, separate pin or rod, are cumbersome, and these tools are frequently lost, leading to inefficiency.

Furthermore, conventional covers are static, single-function devices. They lack the intelligence to be configured for different applications or environments. The alarm behavior is fixed, forcing manufacturers and distributors to manage numerous distinct models for different use cases, increasing cost and complexity. They cannot be adapted to meet specific regulatory requirements, such as synchronizing strobe flashes with a building's main fire alarm system or adjusting patterns to prevent triggering photosensitive epilepsy. This one-size-fits-all approach fails to provide optimal safety and deterrence. For example, the alarm ceases the moment the cover is closed, offering little consequence for nuisance activations.

Additionally, existing covers rely on static printed text for warnings, which is ineffective for visually impaired individuals and cannot provide dynamic, context-specific instructions, such as audibly warning a user about the specific consequence of activating a gas suppression system.

Therefore, a significant need exists for an intelligent, adaptable, and programmable safety cover that overcomes these deficiencies, improving convenience for installers, enhancing safety for occupants, and providing robust, configurable protection for a wide variety of critical activation devices.

BRIEF SUMMARY OF THE INVENTION

The present invention addresses the above and other needs by providing a programmable safety cover system for an emergency activation device. The system includes a housing and an intelligent alarm assembly integrated therein. The alarm assembly is controlled by a programmable controller or microcontroller, transforming the cover from a static mechanical device into a field-configurable safety solution.

In accordance with one aspect of the invention, there is provided a user-actuatable element, referred to as a delay mechanism. When engaged by an installer or maintenance personnel, the controller initiates a programmable "grace period." During this software-defined delay, the alarm assembly's sound emitter and light source are suppressed, allowing for quiet and efficient installation or servicing. At the conclusion of the grace period, the controller can provide an acknowledgment signal (e.g., a brief chirp or flash) to indicate the system is armed and fully operational.

In another embodiment, the invention provides for field-programmable alarm parameters. The controller is configured to have its operational parameters modified without hardware changes. These parameters include, but are not limited to, the duration of the alarm, the pattern of the sounder and strobe, and synchronization with external systems. This allows a single device to be customized for diverse applications, from fire alarms in schools to industrial equipment shutoffs, and to comply with accessibility standards such as those concerning photosensitive epilepsy.

A particularly novel feature of the invention is the "continued alarming" function. The controller can be programmed to continue activating the sound emitter and/or light source for a configurable period after the cover has been returned to its closed position. This serves as a powerful deterrent against tampering and false activations by making the consequences of improperly lifting the cover more apparent.

The invention further provides for programmable, context-specific audible warnings. The controller can store and play custom audio messages through the sound emitter. This enables clear, spoken warnings tailored to the specific device being protected (e.g., "Warning, activation will release suppression gas") and in multiple languages, enhancing safety and accessibility.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

Figure 1:
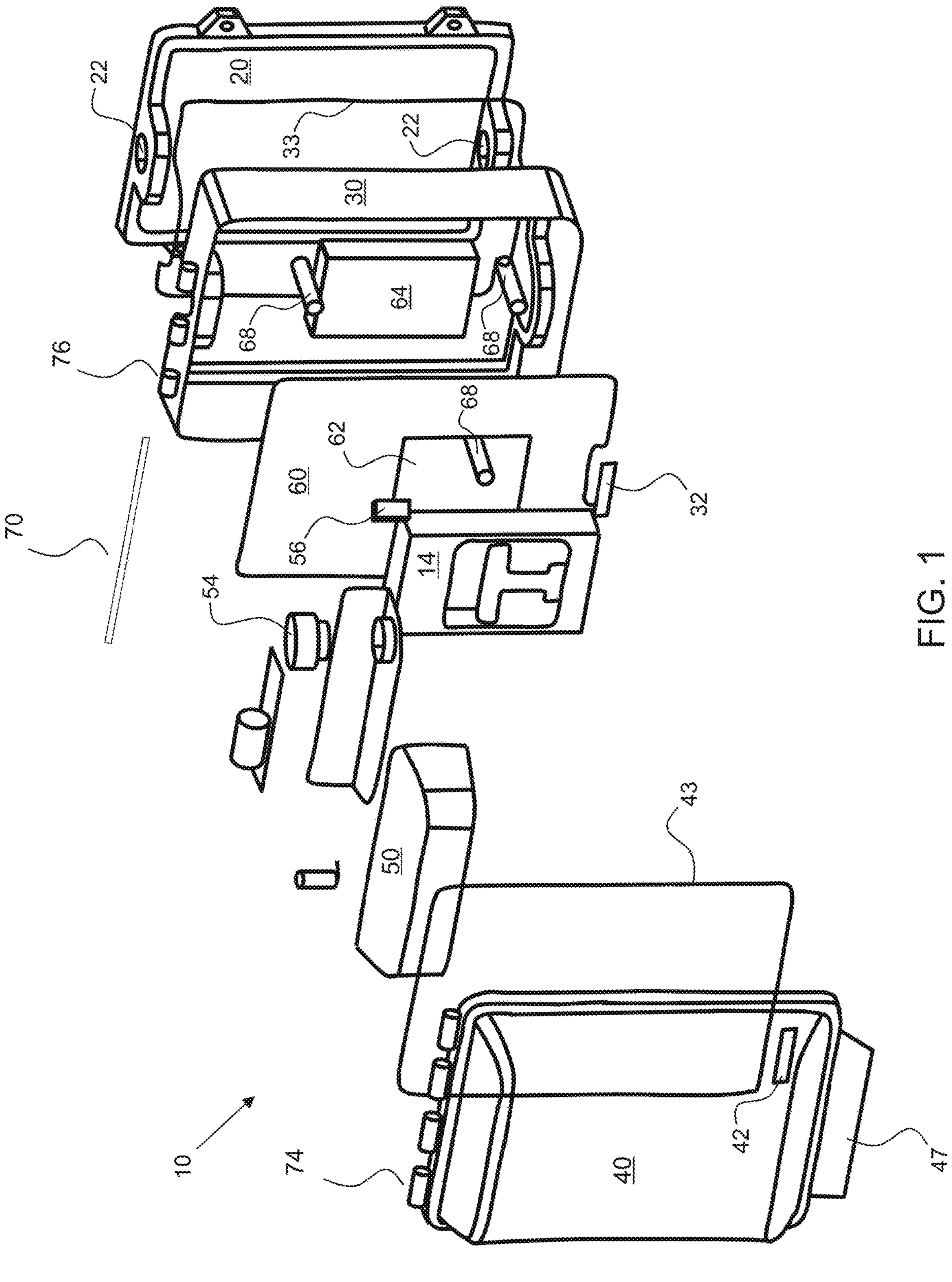
FIG. 1 is a perspective exploded view of a pull station housing in a surface mount configuration from the parent application.
Figure 2:
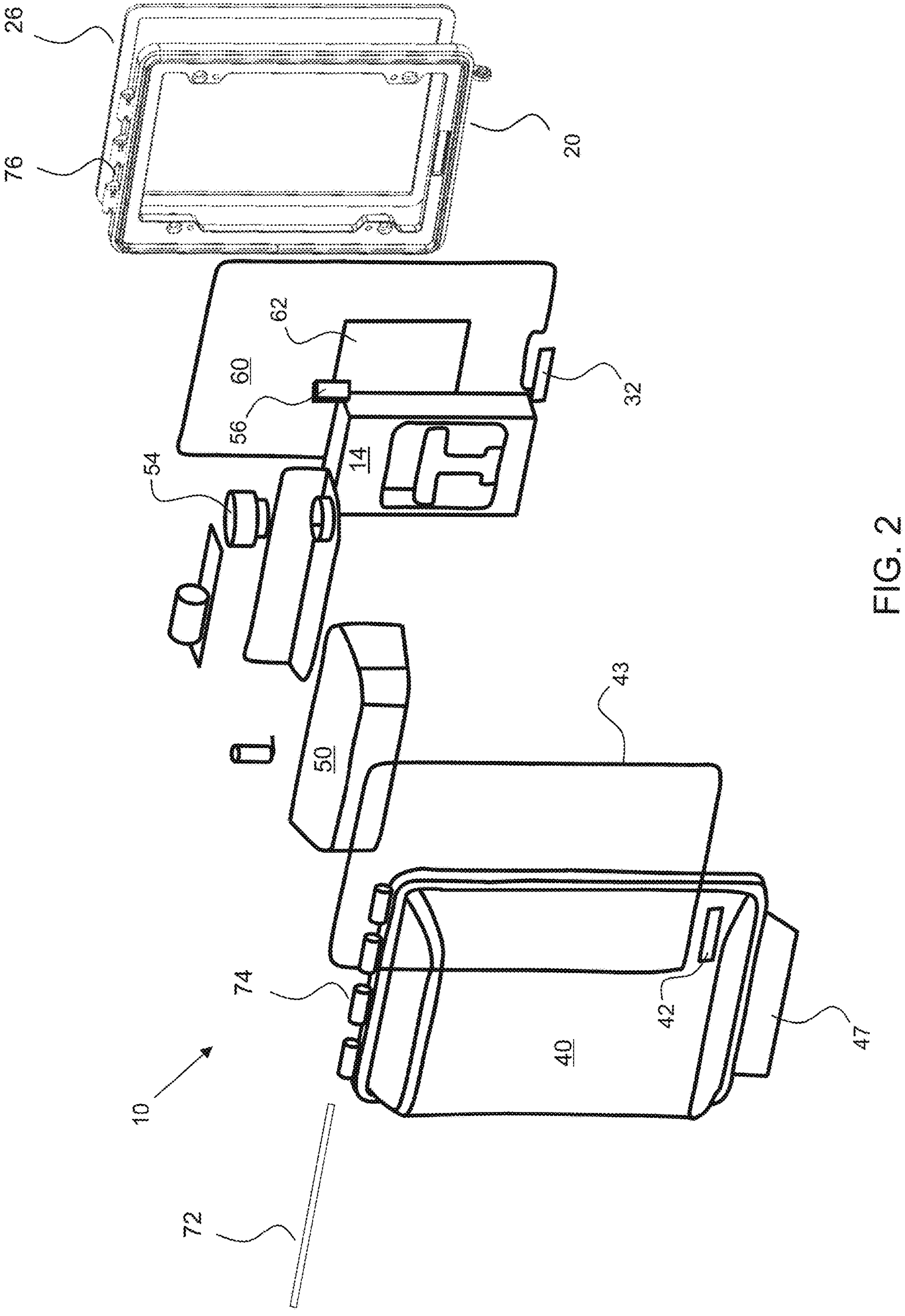
FIG. 2 is a perspective exploded view of a pull station housing in the flush mount configuration from the parent application.
Figure 3:
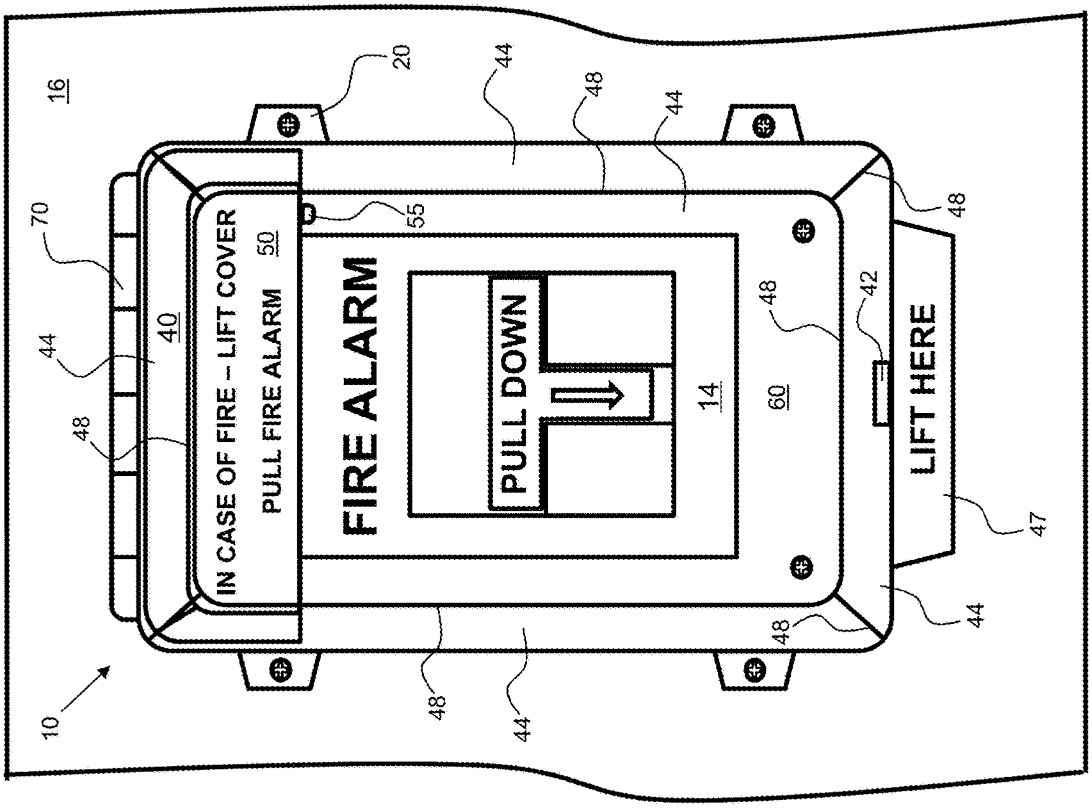
FIG. 3 is a front view of a pull station housing from the parent application.
Figure 4:
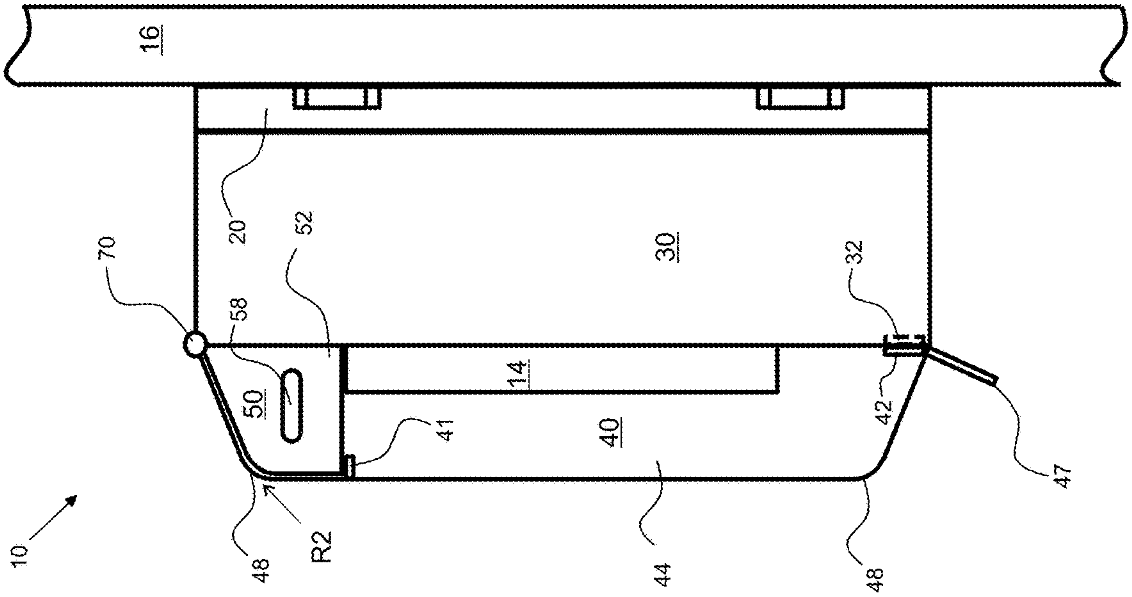
FIG. 4 is a right side view of a pull station housing in a closed position from the parent application.
Figure 5:
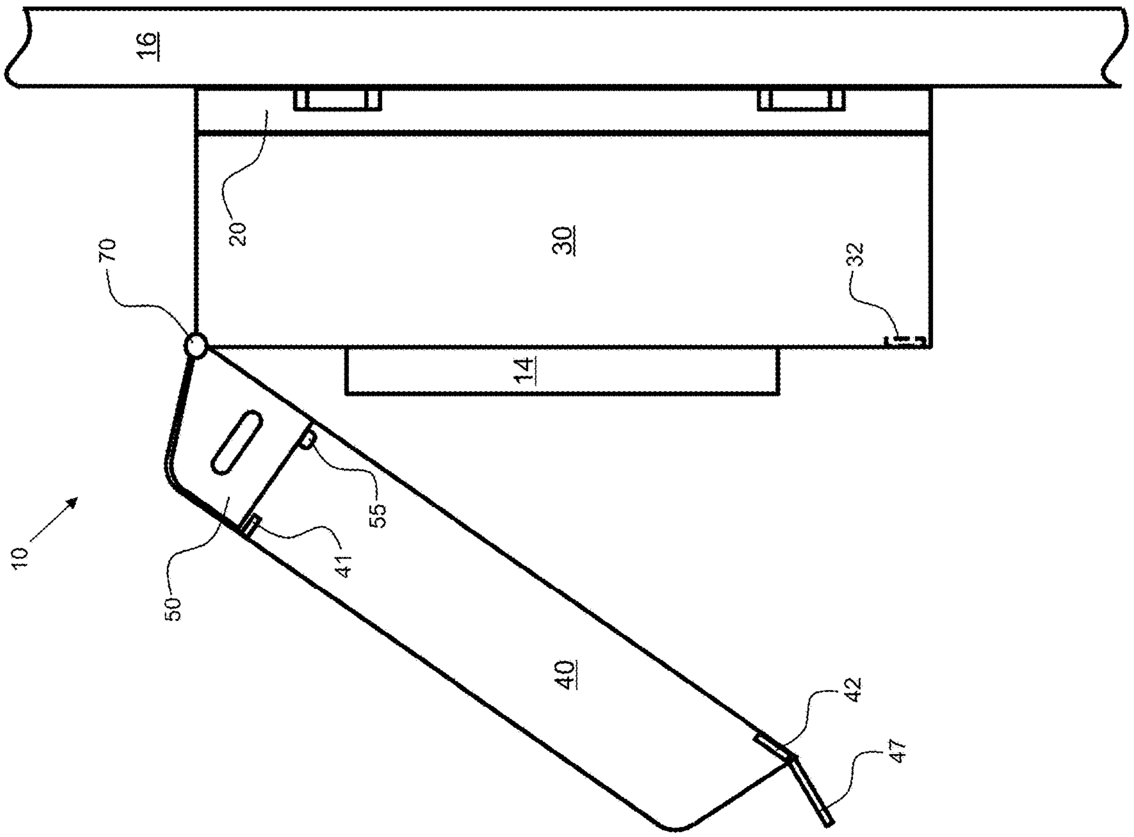
FIG. 5 is a right side view of a pull station housing with a cover configured in an open position from the parent application.
Figure 6:
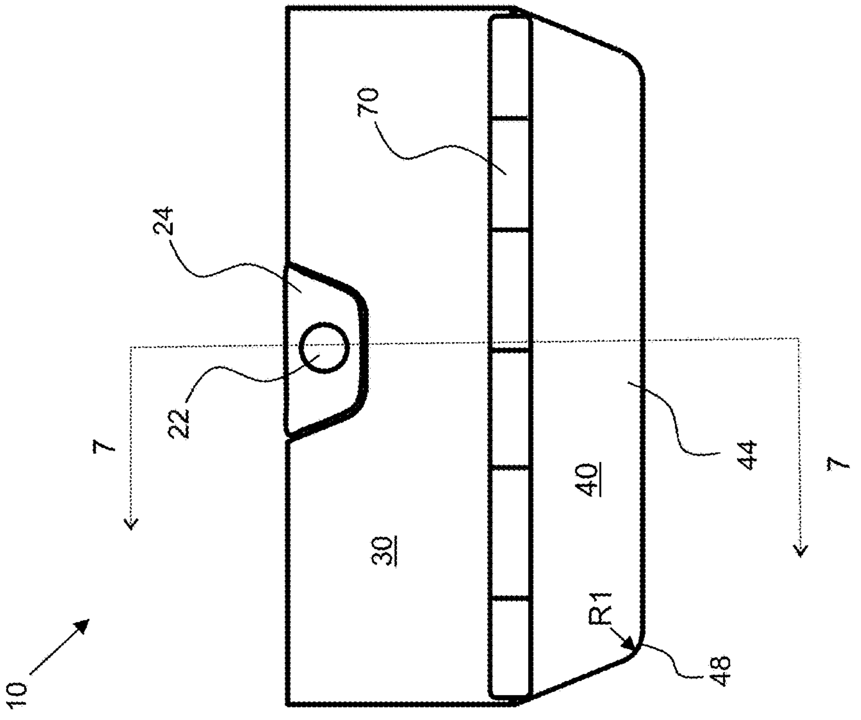
FIG. 6 is a top view of a pull station housing from the parent application.
Figure 7:
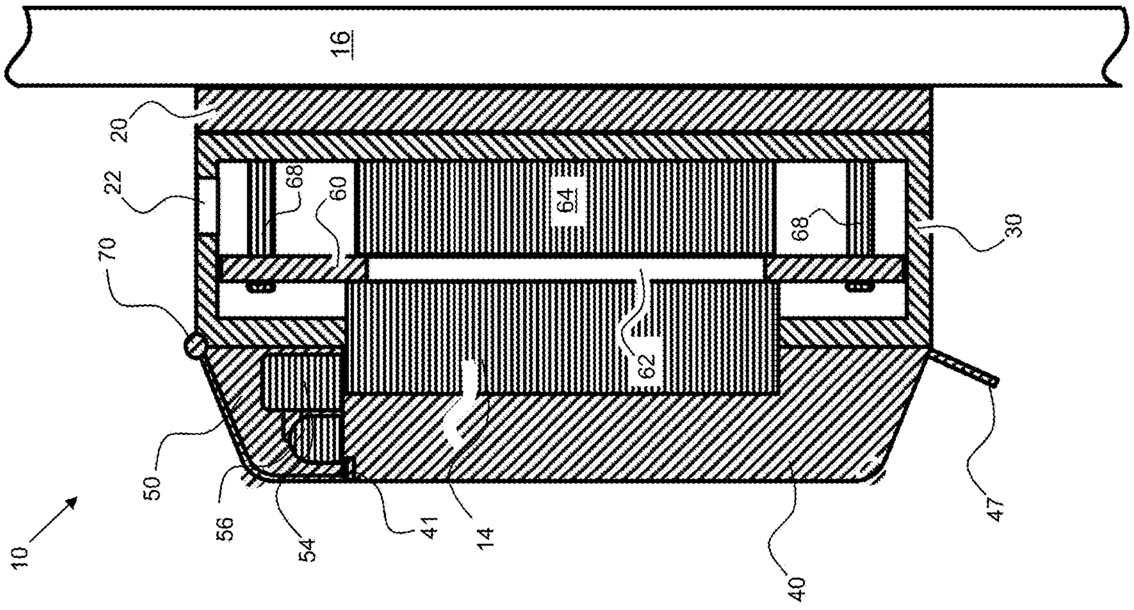
FIG. 7 is a right side cross-section view of a pull station housing along lines 7-7 of FIG. 6, from the parent application.
Figure 8:
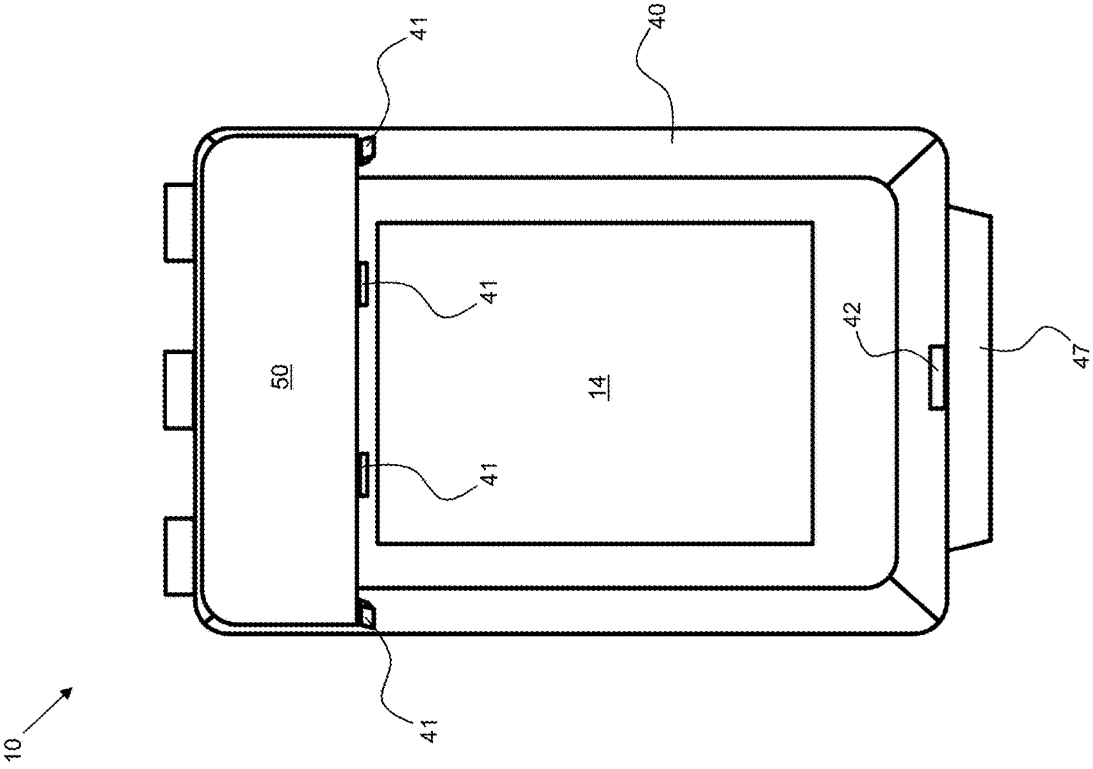
FIG. 8 is a rear view of a pull station housing from the parent application.
Figure 10:
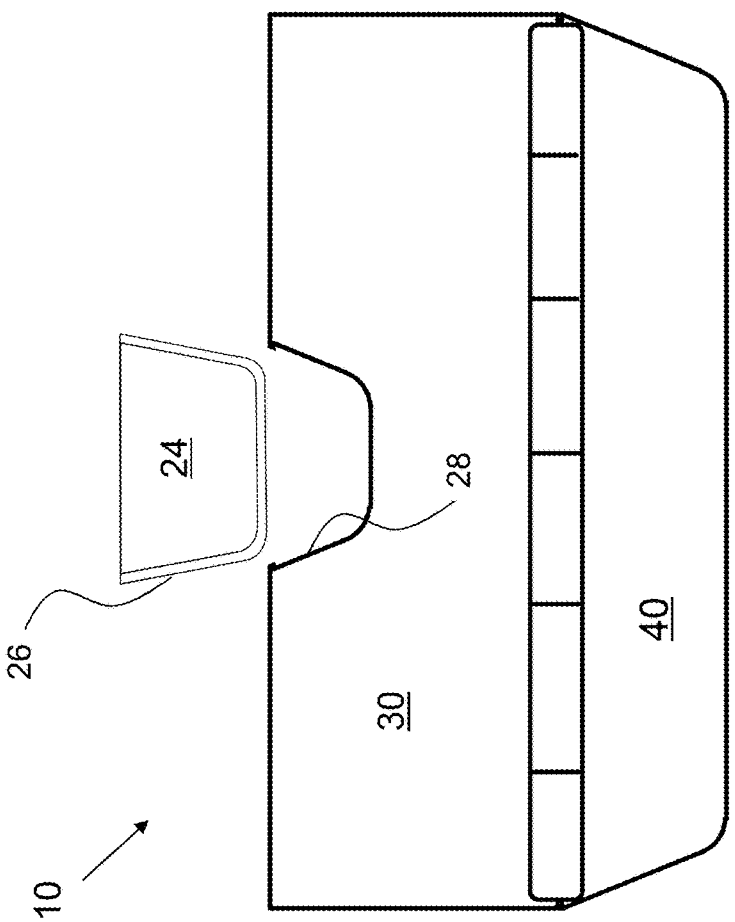
FIG. 10 is a top view of the pull cover sliding into the groove of the frame from the parent application.
Figure 9A:
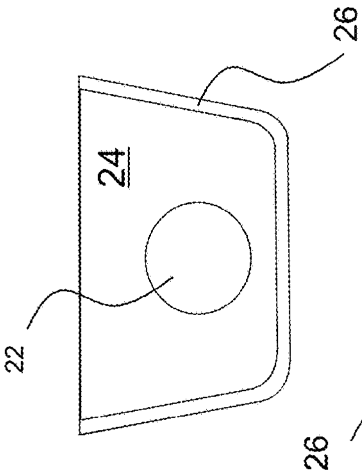
FIG. 9A is a top view of a conduit insert from the parent application.
Figure 9B:
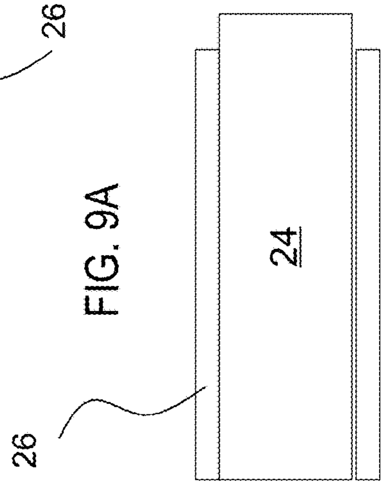
FIG. 9B is a side view of the conduit insert from the parent application.
Figure 9C:
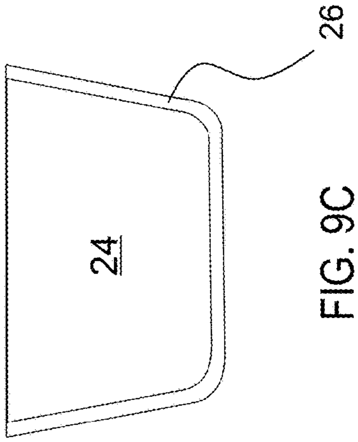
FIG. 9C is a top view of a solid conduit insert from the parent application.
Figure 12:
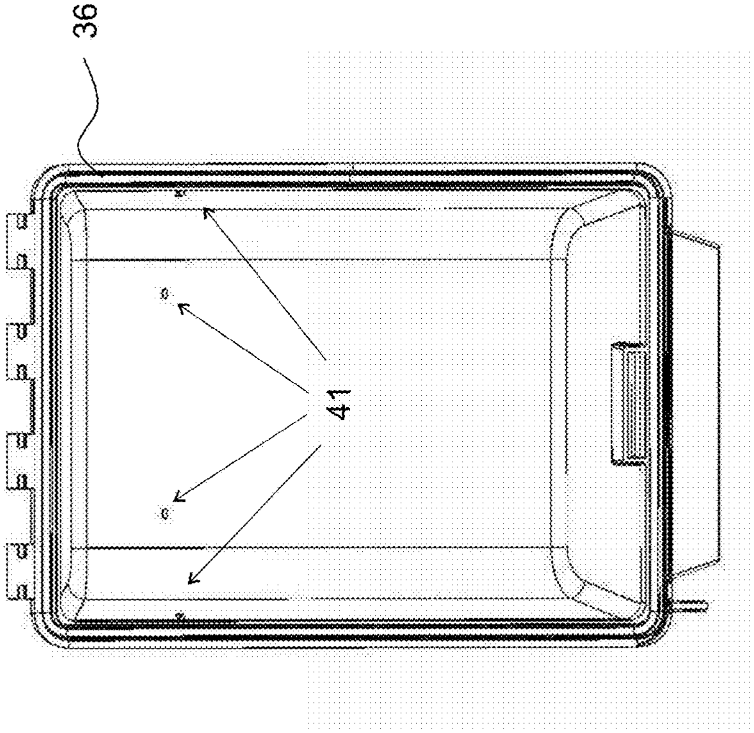
FIG. 12 is a rear view of the cover from the parent application.
Figure 11:
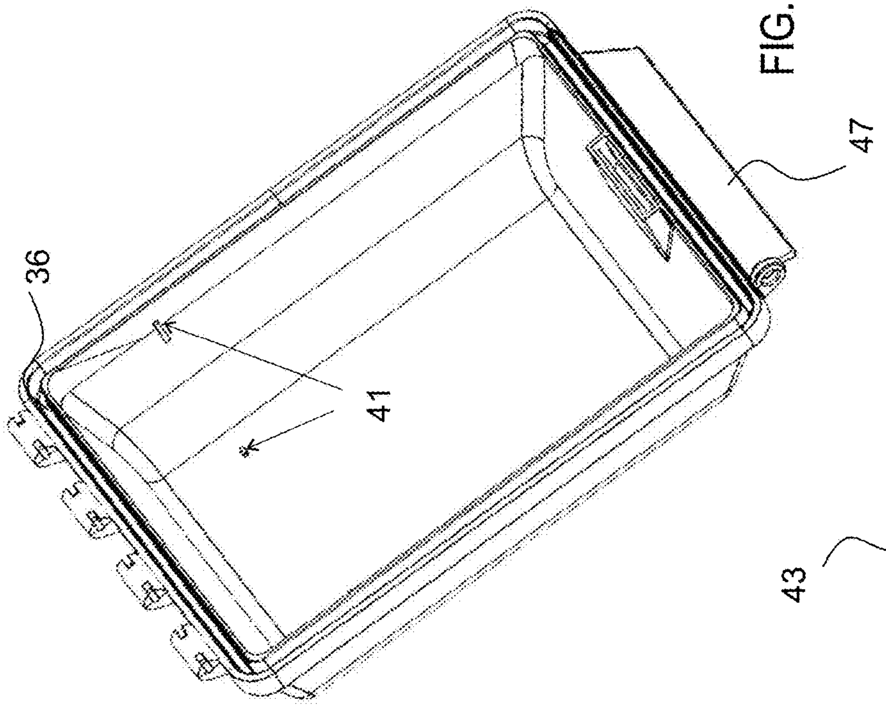
FIG. 11 is a perspective view of the back of the cover from the parent application.
Figure 13:
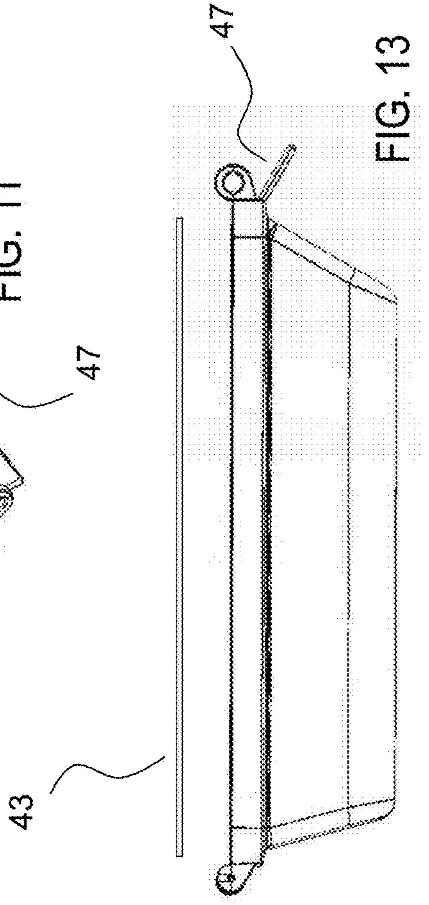
FIG. 13 is a horizontal exploded view of the cover and the cover sealing ring from the parent application.
Figure 14:
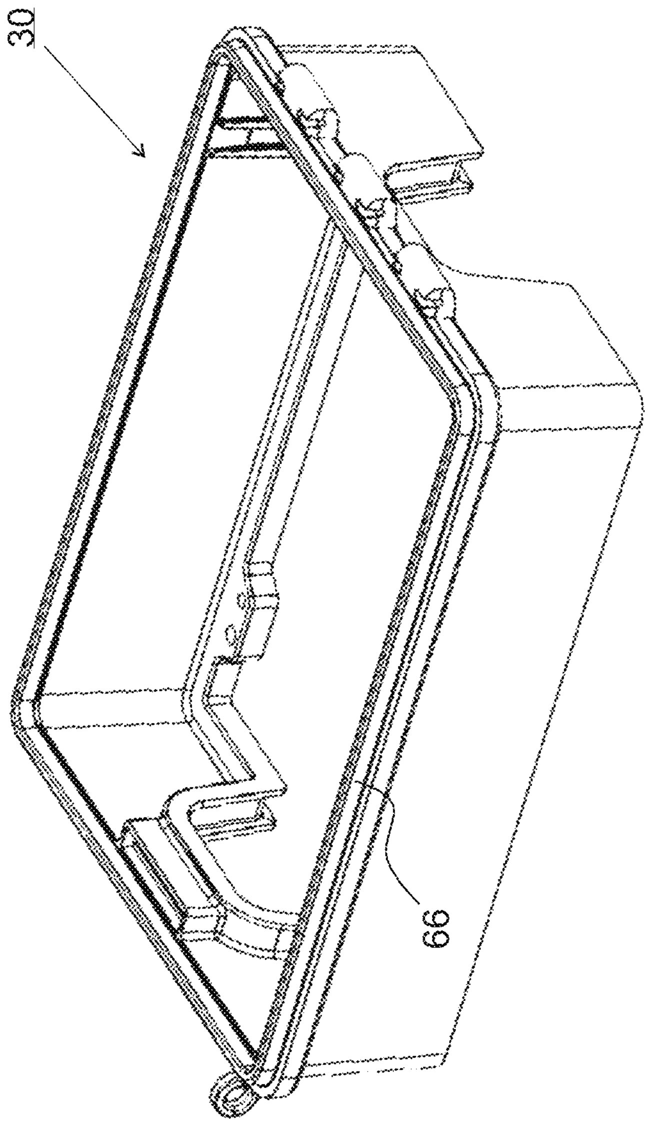
FIG. 14 is a perspective view of the surface mount frame from the parent application.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

The detailed description from the original specification, covering FIGS. 1-15 and elements 10, 14, 16, 20, 22, 24, 26, 28, 30, 32, 33, 36, 40-44, 47, 48, 60, 62, 64, 66, 68, 70, 72, 74, 76, R1, and R2 would be included here, incorporated by reference and summarized as follows for brevity.

The parent application describes a protective housing 10 for an alarm pull station 14, featuring a baseplate 20, a frame 30, and a cover 40. A key feature is the magnetic engagement means 32, 42 that securely holds the cover in a closed position while allowing for release when a sufficient pulling force is applied to a handle 47. The design also incorporates sealing members 33, 43 to create a weather-resistant enclosure, and various mounting configurations.

The present invention introduces a novel programmable alarm assembly 50 that can be integrated into the protective housing 10 or similar safety covers. This assembly provides intelligent, configurable features that represent a significant advancement over the static alarms of the prior art.

Figure 15:
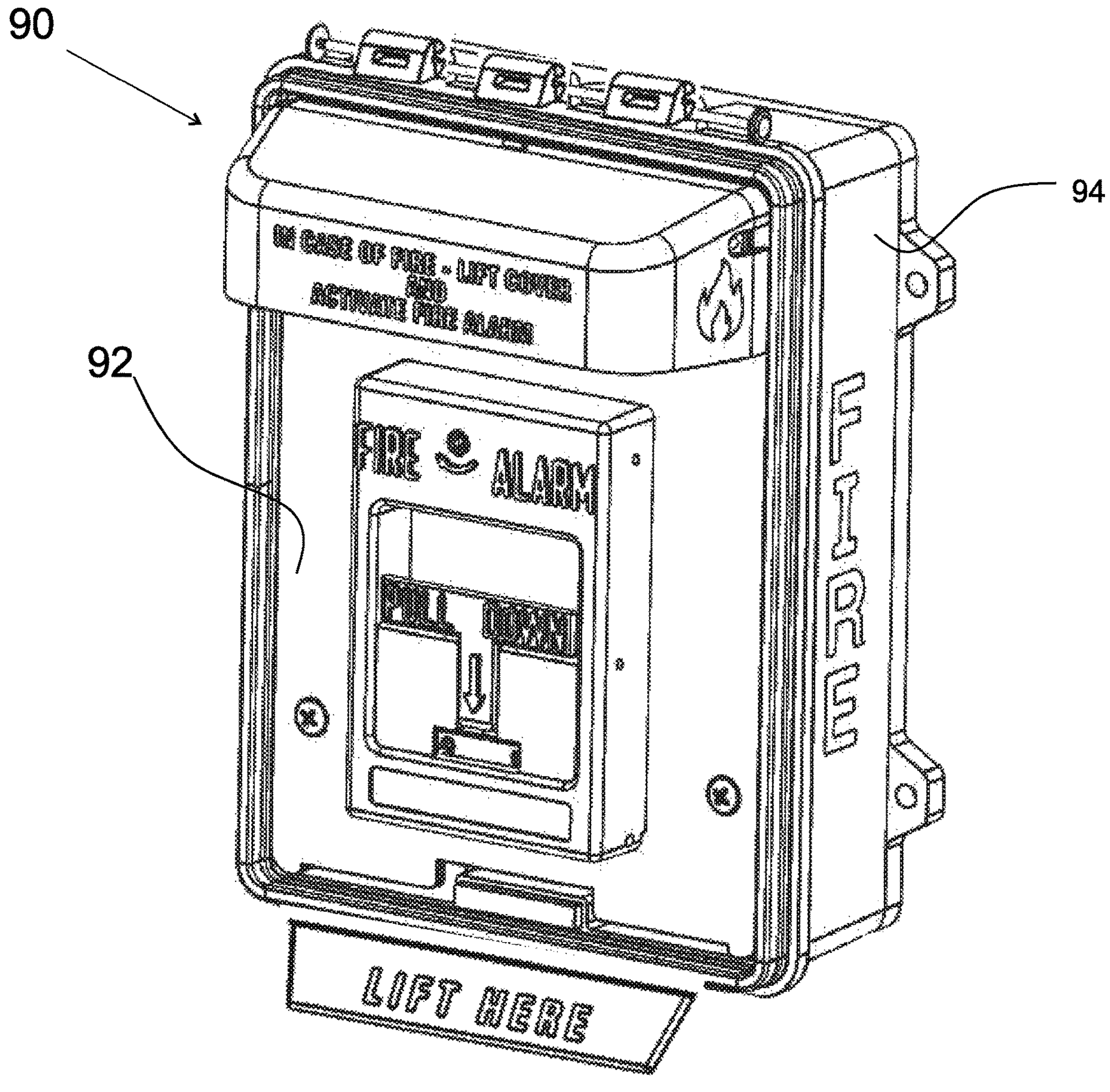
FIG. 15 is a perspective view of the pull station housing.

FIG. 15 shows a perspective view of a protective housing 90 comprising a cover 92 and a base 94.

Figure 16:
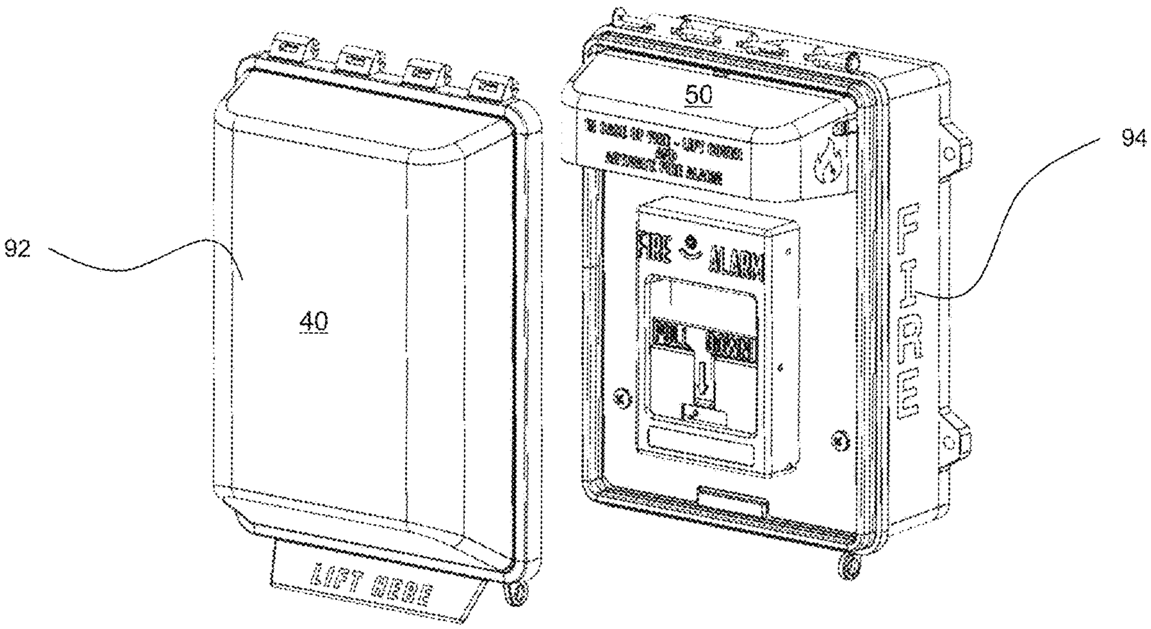
FIG. 16 is a partial exploded view of a pull station housing, in accordance with an embodiment of the present invention.
Figure 17:
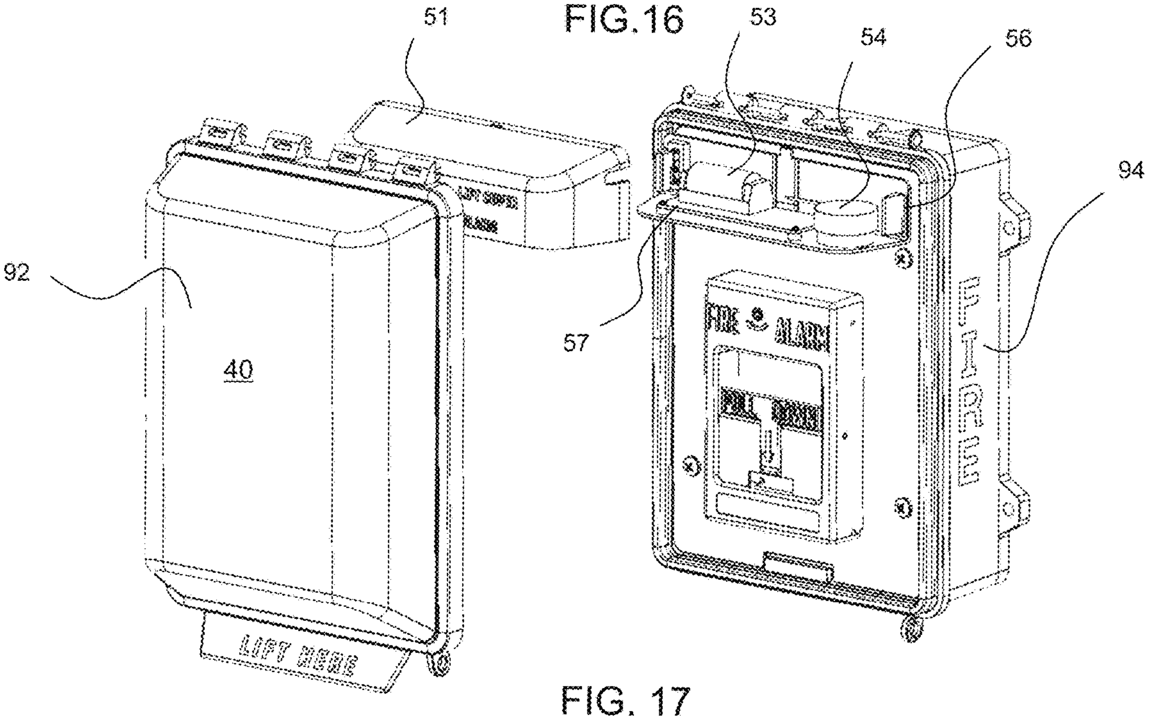
FIG. 17 is a partial exploded view of the housing of FIG. 16 showing a partial exploded view of the alarm assembly.

FIG. 16 shows a partial exploded view of the protective housing, and FIG. 17 shows an alarm assembly cover 51 detached from the main assembly.

Figure 18:
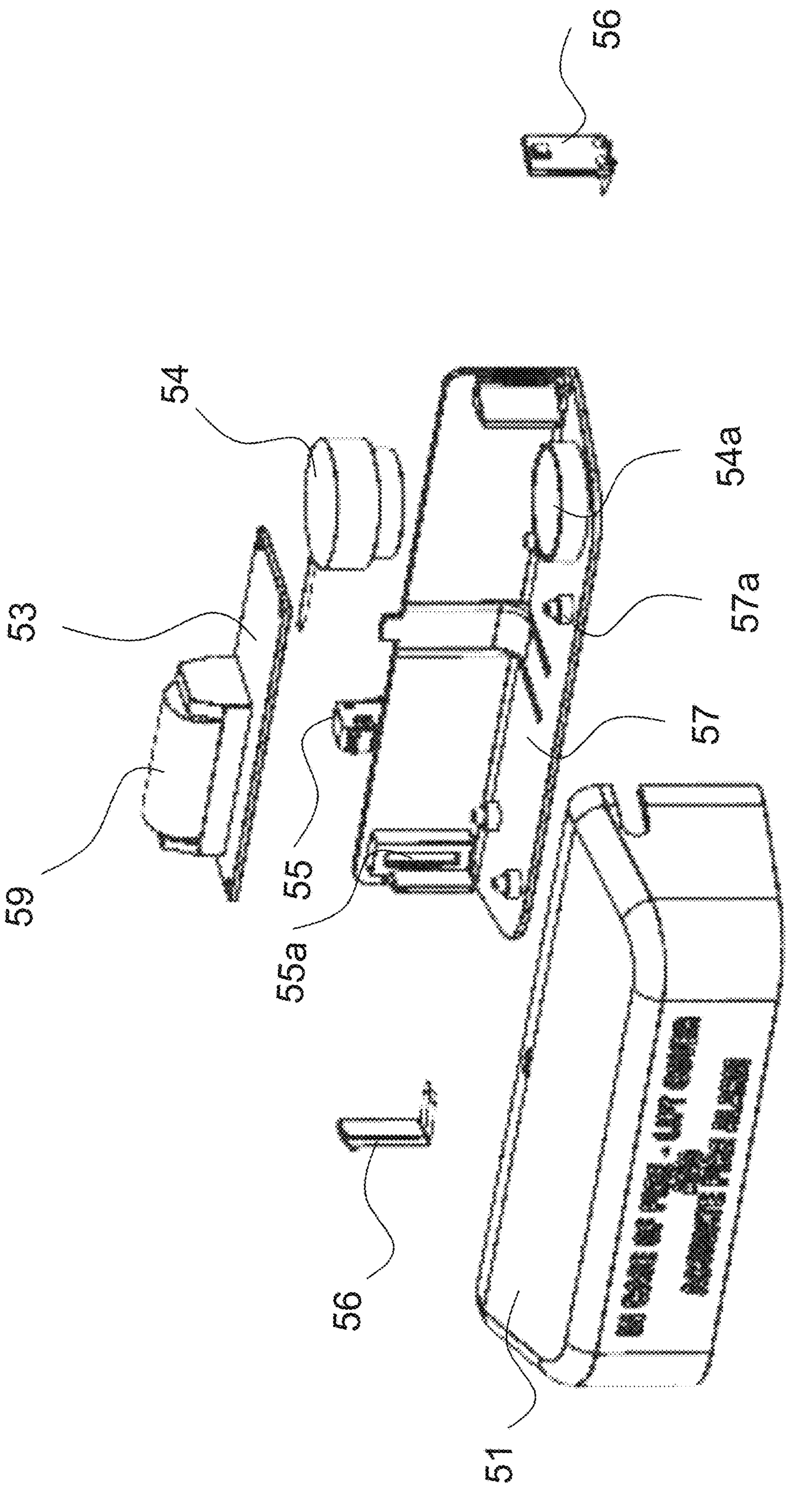
FIG. 18 is an exploded view of the programmable alarm assembly, in accordance with an embodiment of the present invention.

FIG. 18 provides a detailed exploded view of the programmable alarm assembly 50. The assembly comprises an alarm cover 51 and an alarm base 57. Housed within are the key electronic components: an alarm controller 53, which is a microcontroller or similar processing unit; a sound emitter 54; and a light source 56. The alarm controller 53 is programmable. The components are mounted on a printed circuit board (PCB), which is secured to the alarm base 57 by standoffs 57*a*. A battery 59 provides power.

Figure 19:
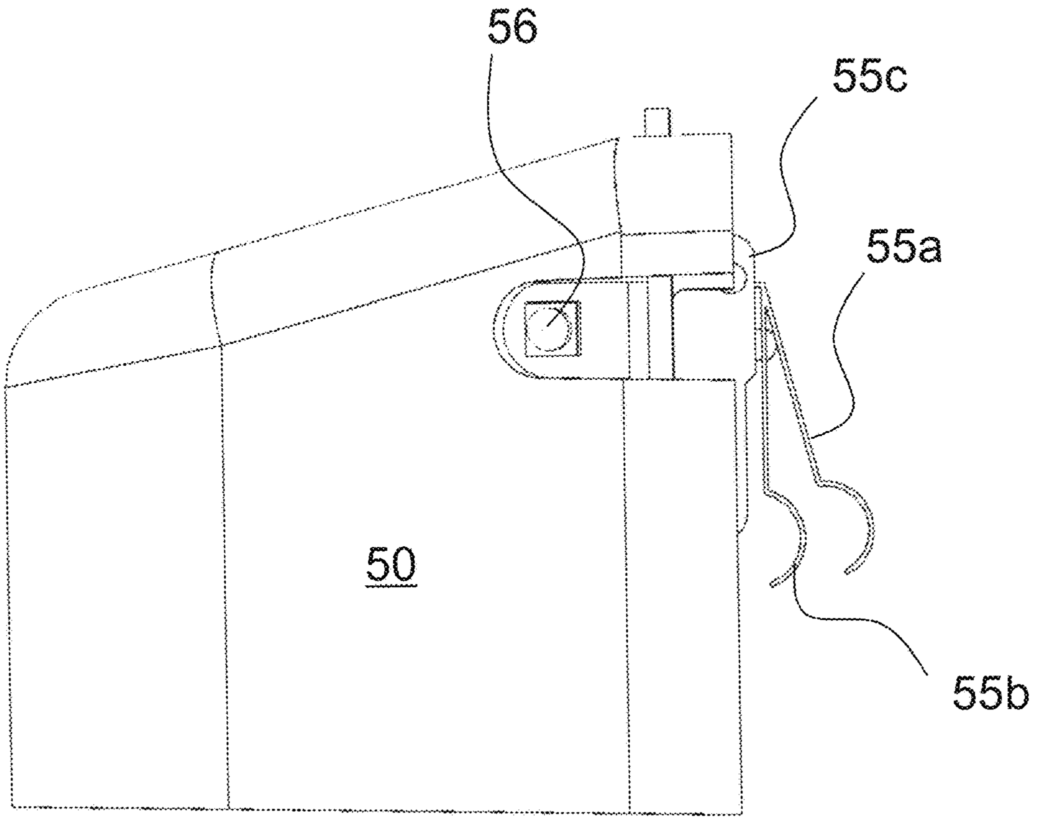
FIG. 19 is a right side view of the alarm assembly, in accordance with an embodiment of the present invention.
Figure 20:
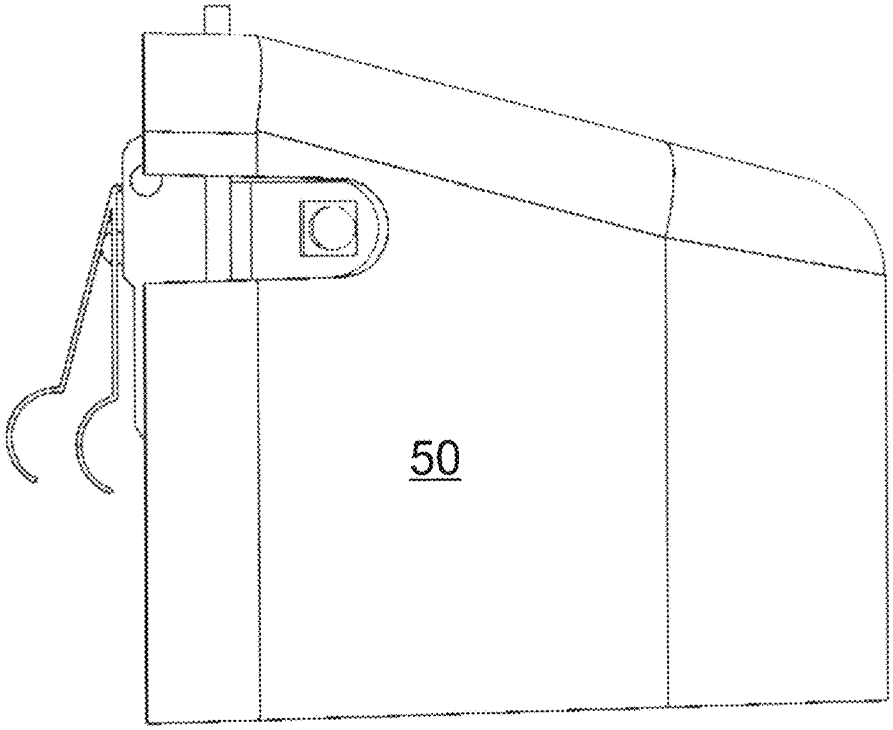
FIG. 20 is a left side view of the alarm assembly, in accordance with an embodiment of the present invention.

The delay mechanism 55, which serves as the user-actuatable element for initiating the installer grace period. As shown in FIG. 19 and FIG. 20, the delay mechanism 55 includes a switch activation top arm 55*a* and bottom arm 55*b* that interact with a micro switch 55*c*. When an installer presses the external portion of the mechanism, the arms pivot to actuate the micro switch 55*c*, sending a signal to the alarm controller 53.

Figure 21:
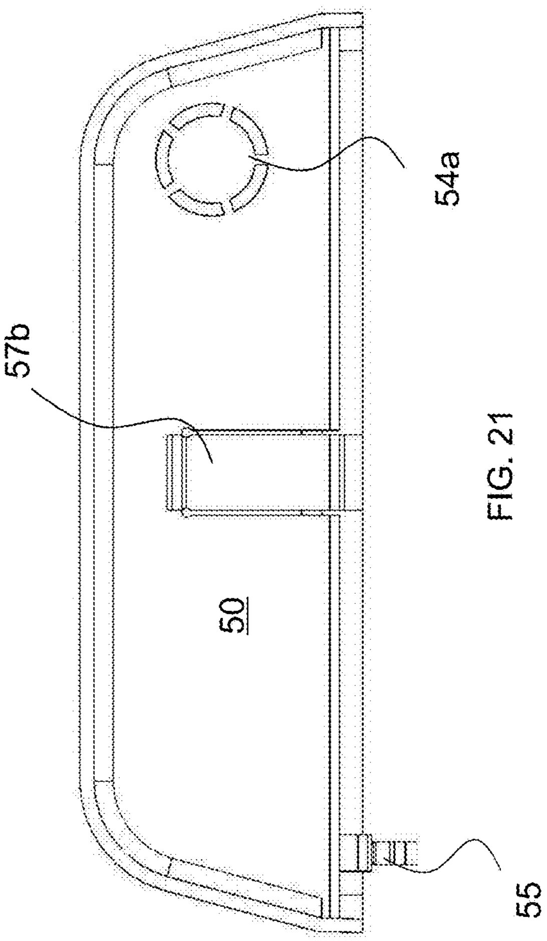
FIG. 21 is a bottom-up view of the alarm assembly, in accordance with an embodiment of the present invention.
Figure 22:
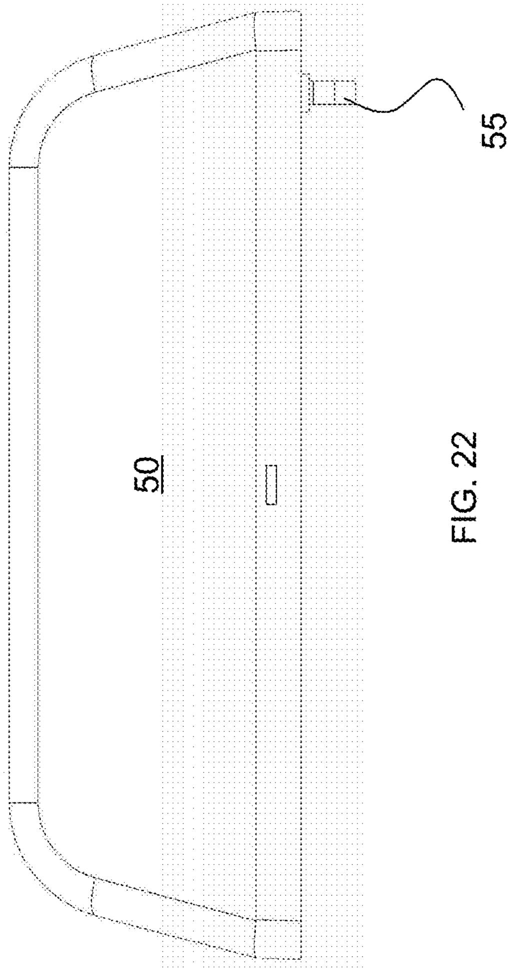
FIG. 22 is a top-down view of the alarm assembly, in accordance with an embodiment of the present invention.
Figure 23:
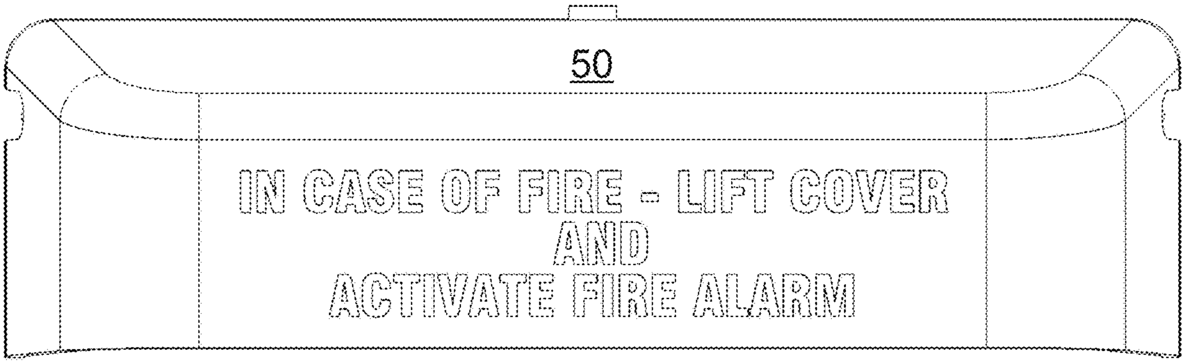
FIG. 23 is a front view of the alarm assembly, in accordance with an embodiment of the present invention.
Figure 24:
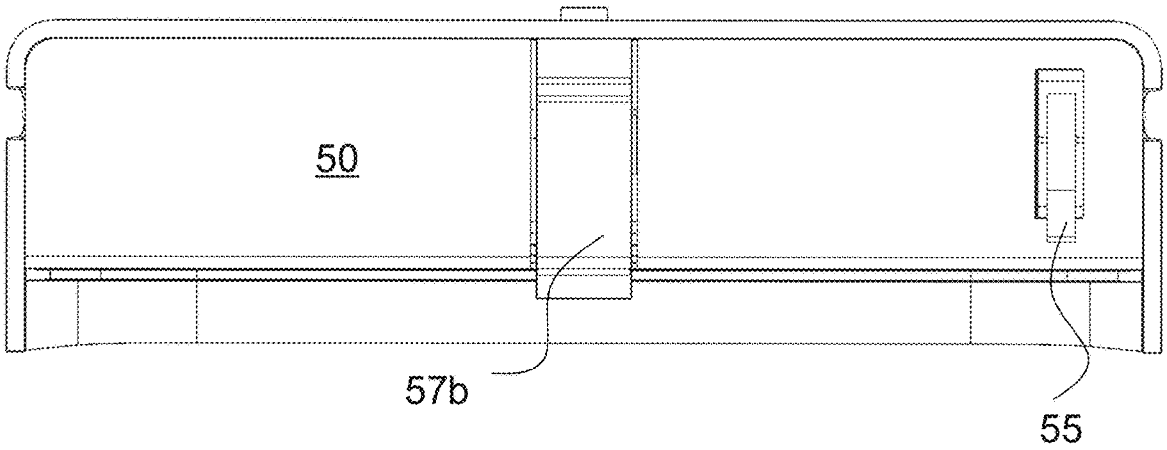
FIG. 24 is a rear view of the alarm assembly, in accordance with an embodiment of the present invention.
Figure 25:
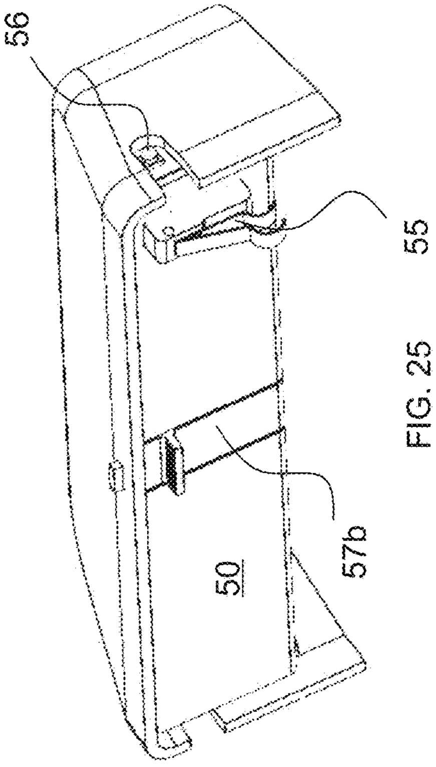
FIG. 25 is a right rear perspective view of the alarm assembly, in accordance with an embodiment of the present invention.
Figure 26:
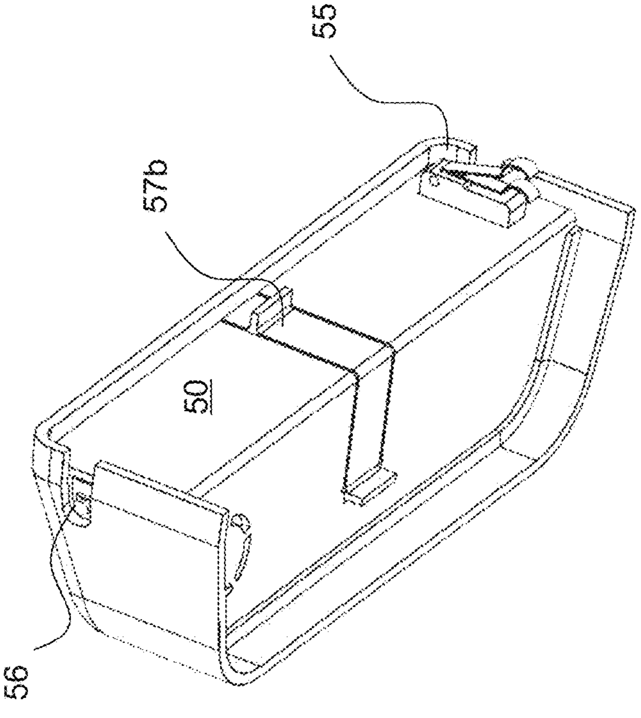
FIG. 26 is a bottom-up rear perspective view of the alarm assembly, in accordance with an embodiment of the present invention.

FIG. 21 shows a bottom-up view of the alarm assembly 50, highlighting the sound opening 54*a* which allows sound from the emitter 54 to exit the alarm assembly. An alarm base latch 57*b* helps secure the alarm cover 51 to the alarm base 57. FIG. 22 shows a top-down view of the alarm assembly.

In operation, the alarm controller 53 is configured with software to manage the alarm assembly's functions. The key programmable features are as follows:

Installer Grace Period: When an installer needs to service the unit or replace the battery 59, they press the delay mechanism 55. The controller 53 receives this input and initiates a pre-programmed, software-defined grace period (e.g., 30 seconds, 1 minute, or any other duration). During this period, the controller 53 suppresses activation of the sound emitter 54 and light source 56, allowing the installer to work without the alarm sounding. After the grace period expires, the controller 53 can be programmed to emit an acknowledgment signal, such as a single beep or flash, to confirm the device is armed.

Field-Programmable Parameters: The alarm controller 53 is designed to be field-programmable. This capability allows a single hardware model to serve numerous applications. The programmable parameters include:

Alarm Duration and Pattern: The duration, volume, and pattern (e.g., continuous, pulsed, coded) of the sound emitter 54 and the flash rate and pattern of the light source 56 can be configured.

Accessibility Compliance: The strobe flash rate can be programmed to be below 2 Hz to comply with standards for preventing photosensitive epileptic seizures.

System Synchronization: The controller 53 can be configured to receive an external signal to synchronize its strobe flash with a building's main fire alarm system, as required by standards like NFPA 72.

Continued Alarming After Closure: A unique deterrent feature is the ability to program the controller 53 to continue activating the alarm for a configurable period (e.g., 30 seconds) even after the main cover 40 is returned to the closed position. This feature makes nuisance activations more conspicuous, discouraging tampering.

Customizable Audible Warnings: The controller 53 can store and play pre-recorded audio files through the sound emitter 54. This allows for context-specific warnings like, "Warning, emergency stop will be activated," or "Warning, Halon gas release imminent." These messages can be programmed in different languages, significantly improving safety and accessibility.

Future-Proofing and Remote Configuration: The architecture is designed to be implementation-agnostic. The invention covers programming the controller 53 through any means, including future methods such as via a mobile application communicating wirelessly (e.g., via Bluetooth or NFC) with the controller. This would allow for easy field configuration, diagnostics, and the application of pre-set profiles for different industries.

The scope of this invention is not limited to a "fire alarm" cover but to any programmable safety cover system used to protect a critical activation device, regardless of its physical form factor or the industry in which it is used.

While the invention herein disclosed has been described by means of specific embodiments and applications thereof, numerous modifications and variations could be made thereto by those skilled in the art without departing from the scope of the invention set forth in the claims.

I claim:

1. A programmable safety cover system comprising:

a housing having a cover and a base wherein the cover is movably attached to the base;

an alarm assembly disposed within the housing, the alarm assembly comprising:

a programmable controller, a at least one sound emitter, a at least one light source; and a at least one user-actuatable element communicatively coupled to the controller;

wherein the at least one sound emitter and the at least one light source is triggered when the cover is disengaged from the base; and wherein the controller is further configured to detect that the cover is re-engaged with the base and, in response to said detection, continue to activate said at least one sound emitter and the at least one light source for a pre-programmed duration after the cover is re-engaged with the base.

2. The system of claim 1, wherein the controller is configured to, upon actuation of the at least one user-actuatable element, initiate a programmable grace period during which the at least one sound emitter and the at least one light source are suppressed.

3. The system of claim 2, wherein the controller is further configured to provide an acknowledgment signal after the grace period expires.

4. The system of claim 1, wherein the controller is field-programmable to modify at least one operational parameter.

5. The system of claim 4, wherein the operational parameter is selected from the group consisting of: an alarm duration, a sound emitter pattern, a light source flash rate, and a custom audio message.

6. The system of claim 5, wherein the custom audio message is a spoken warning corresponding to a specific function of an emergency activation device.

7. The system of claim 1, wherein the user-actuatable element is a push-button mechanism comprising a micro switch.

8. The system of claim 1, wherein the controller is configured to receive configuration parameters from a mobile computing device.

9. A method for operating a programmable safety cover, the method comprising:

providing a safety housing comprising a cover and a base;

an alarm assembly within the housing having a programmable controller, a user-actuatable element, an at least one sound emitter, and an at least one light source;

when the alarm is triggered, receiving, at the controller, a signal from the user-actuatable element indicating an installer-initiated action;

in response to the signal, initiating, by the controller, a programmable grace period during which activation of the at least one sound emitter and the at least one light source is suppressed;

at the conclusion of the grace period, generating, by the controller, an acknowledgment signal to indicate the safety housing is armed;

detecting, by the controller, that the cover has been moved to disengage from the base;

in response to said detection, activating the at least one sound emitter and the at least one light source;

further detecting, by the controller, that the cover is re-engaged with the base; and continuing to activate said at least one sound emitter and the at least one light source for a pre-programmed duration after the cover is re-engaged with the base.

10. The method of claim 9, further comprising:

receiving, at the controller, new configuration data; and modifying an operational parameter of the alarm assembly based on the new configuration data, wherein the operational parameter is selected from the group consisting of: an alarm duration, a sound emitter pattern, a light source flash rate, and a custom audio message to be played by the sound emitter.

11. The method of claim 10, wherein receiving the new configuration data comprises receiving a wireless transmission from a mobile computing device.

12. An alarm assembly for a protective housing for an emergency activation device, the assembly comprising:

a housing having a cover and a base wherein the cover is moveably attached to the base;

a programmable controller disposed within the housing;

an at least one sound emitter and an at least one light source operatively coupled to the controller; and a delay mechanism accessible from an exterior of the housing and communicatively coupled to the controller;

wherein the controller is configured with software to perform the steps of:

(a) in response to an actuation of the delay mechanism, initiating a programmable time delay during which the sound emitter and light source are deactivated;

(b) in response to the protective cover being opened, activating the sound emitter and light source according to a programmable alarm pattern; and (c) in response to the cover being re-engaged to the base, continuing to activate the sound emitter and light source for a pre-programmed duration.

* * * * *